United States Patent
Ko et al.

(10) Patent No.: US 10,738,841 B2
(45) Date of Patent: Aug. 11, 2020

(54) OIL PUMP CONTROL METHOD FOR DCT

(71) Applicants: Hyundai Motor Company, Seoul (KR); Kia Motors Corporation, Seoul (KR)

(72) Inventors: Young Ho Ko, Yongin-si (KR); Young Min Yoon, Hwaseong-si (KR); Jin Sung Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/387,338

(22) Filed: Apr. 17, 2019

(65) Prior Publication Data

US 2020/0166086 A1 May 28, 2020

(30) Foreign Application Priority Data

Nov. 26, 2018 (KR) .................... 10-2018-0147626

(51) Int. Cl.
*F16D 25/10* (2006.01)
(52) U.S. Cl.
CPC ...... *F16D 25/10* (2013.01); *F16D 2500/1026* (2013.01)
(58) Field of Classification Search
USPC ........................................................ 701/68
See application file for complete search history.

(56) References Cited

U.S. PATENT DOCUMENTS

| 9,188,221 B2* | 11/2015 | Moorman | F16H 61/0251 |
| 9,322,305 B2* | 4/2016 | Lee | F01M 1/02 |
| 10,274,024 B2* | 4/2019 | Shimozawa | F16D 25/0638 |
| 10,293,687 B2* | 5/2019 | Nozu | F16D 27/118 |
| 10,598,266 B2* | 3/2020 | Mohlmann | B60K 23/0808 |

FOREIGN PATENT DOCUMENTS

KR 10-2016-0049283 A 5/2016

* cited by examiner

*Primary Examiner* — Dirk Wright
(74) *Attorney, Agent, or Firm* — Morgan, Lewis & Bockius LLP

(57) ABSTRACT

An oil pump control method for a DCT may include estimating line pressure, using a pressure-up model formed from a relationship between an oil pump driving current and a hydraulic pressure; stopping the oil pump when the line pressure estimated from the pressure-up model is equal to or higher than a predetermined upper limit hydraulic pressure; estimating a dropping line pressure from a first pressure-down model for a predetermined first reference time after stopping the oil pump on the basis of the line pressure estimated when the oil pump is stopped as an initial value; forming a second pressure-down model by opening a solenoid valve supplying hydraulic pressure to a non-drive side clutch, and estimating a line pressure from the second pressure-down model, and returning to the pressure-up step when the line pressure reaches predetermined lower limit hydraulic pressure or less.

17 Claims, 4 Drawing Sheets

OIL PUMP CONTROL METHOD FOR DCT

CROSS-REFERENCE TO RELATED APPLICATION

The present application claims priority to Korean Patent Application No. 10-2018-0147626, filed on Nov. 26, 2018, the entire contents of which is incorporated herein for all purposes by this reference.

BACKGROUND OF THE INVENTION

Field of the Invention

The present invention relates to a technology of controlling an oil pump that generates hydraulic pressure for controlling a Dual Clutch Transmission (DCT) mounted on a vehicle.

Description of Related Art

When two clutches of a DCT are multi-plate wet clutches, it is required to stably supply hydraulic pressure for driving the two clutches.

To stably supply hydraulic pressure, as described above, it is preferable to minimize unnecessary consumption of energy and to reduce costs by minimizing use of hydraulic sensors.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an oil pump control method for a DCT, the method being able to reduce costs by minimizing use of hydraulic sensors when generating hydraulic pressure to be supplied to multi-plate wet clutches for the DCT, being able to improve the fuel efficiency and driving range of a vehicle by minimizing energy which is consumed to generate hydraulic pressure, and being able to stably supply hydraulic pressure for controlling the two clutches.

In view of the above aspect, an oil pump control method for a DCT may include: an pressure-up step in which a controller drives an oil pump and estimates line pressure which is generated by the oil pump, using a pressure-up model formed from a relationship between an oil pump driving current and a hydraulic pressure; a stopping step in which the controller stops the oil pump when the line pressure estimated from the pressure-up model is equal to or higher than a predetermined upper limit hydraulic pressure; a first pressure-down estimation step that estimates a dropping line pressure from a first pressure-down model for a predetermined first reference time after stopping the oil pump on the basis of the line pressure estimated when the oil pump is stopped as an initial value; a model-forming step that forms a second pressure-down model by opening a solenoid valve supplying hydraulic pressure to a non-drive side clutch, and correcting the line pressure and measuring hydraulic pressure for a predetermined second reference time using a hydraulic pressure sensor provided to measure hydraulic pressure acting in the non-drive side clutch; and a second pressure-down step in which the controller estimates a line pressure from the second pressure-down model, and returns to the pressure-up step when the line pressure reaches predetermined lower limit hydraulic pressure or less.

The amount of hydraulic pressure drop due to operations of devices that are driven by the line pressure may be considered in the second pressure-down estimation step.

The amount of hydraulic pressure drop due to the operations of the devices that are driven by the line pressure may be obtained from a map formed by measuring a level of line pressure and oil temperature when the devices are operated and line pressure that drops due to the operation of the devices.

The pressure-up model may be a regression model formed on the basis of data of current of a motor driving the oil pump and hydraulic pressure correspondingly generated by the oil pump with the oil pump driven at a constant speed at specific oil temperature.

The first pressure-down model may be set to consider the largest leakage of line pressure due to a check ball accommodated in a worst state on a valve seat of a check valve disposed to stop oil that flows back to the oil pump when the oil pump is stopped.

The predetermined first reference time may be set in accordance with the maximum time which is taken until tendency of a change according to time of line pressure is stabilized after a check ball of a check valve disposed to stop oil that flows back to the oil pump is accommodated on a valve seat when the oil pump is stopped.

In the model-forming step, the second pressure-down model may be formed on the basis of a change in hydraulic pressure measured by the hydraulic pressure sensor in accordance with time for the predetermined second reference time with the solenoid valve maximally open.

The model-forming step may be performed together with learning touch points of the non-drive side clutch.

Oil discharged from the oil pump may pass through a check valve and then may be supplied to two clutches forming the DCT through two solenoid valves, hydraulic pressure of the oil which is supplied to the two clutches may be measured respectively by hydraulic pressure sensors that are separately provided, and a specific pressure sensor for measuring line pressure generated between the check valve and the two solenoid valves may not be provided.

In view of another aspect, a hydraulic pressure supply system for a DCT may include: a hydraulic circuit configured such that oil discharged from an electric oil pump passes through a check valve and is then supplied to two clutches forming a DCT through two separate solenoid valves, a specific pressure sensor for measuring line pressure generated between the check valve and the two solenoid valves is not provided, and pressure of the oil supplied to the two clutches may be measured by separate hydraulic pressure sensor, respectively; and a controller configured for controlling the oil pump using the method.

According to an exemplary embodiment of the present invention, it is possible to reduce costs by minimizing use of hydraulic sensors when generating hydraulic pressure to be supplied to multi-plate wet clutches for the DCT, to improve the fuel efficiency and driving range of a vehicle by minimizing energy which is consumed to generate hydraulic pressure, and to stably supply hydraulic pressure for controlling the two clutches.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
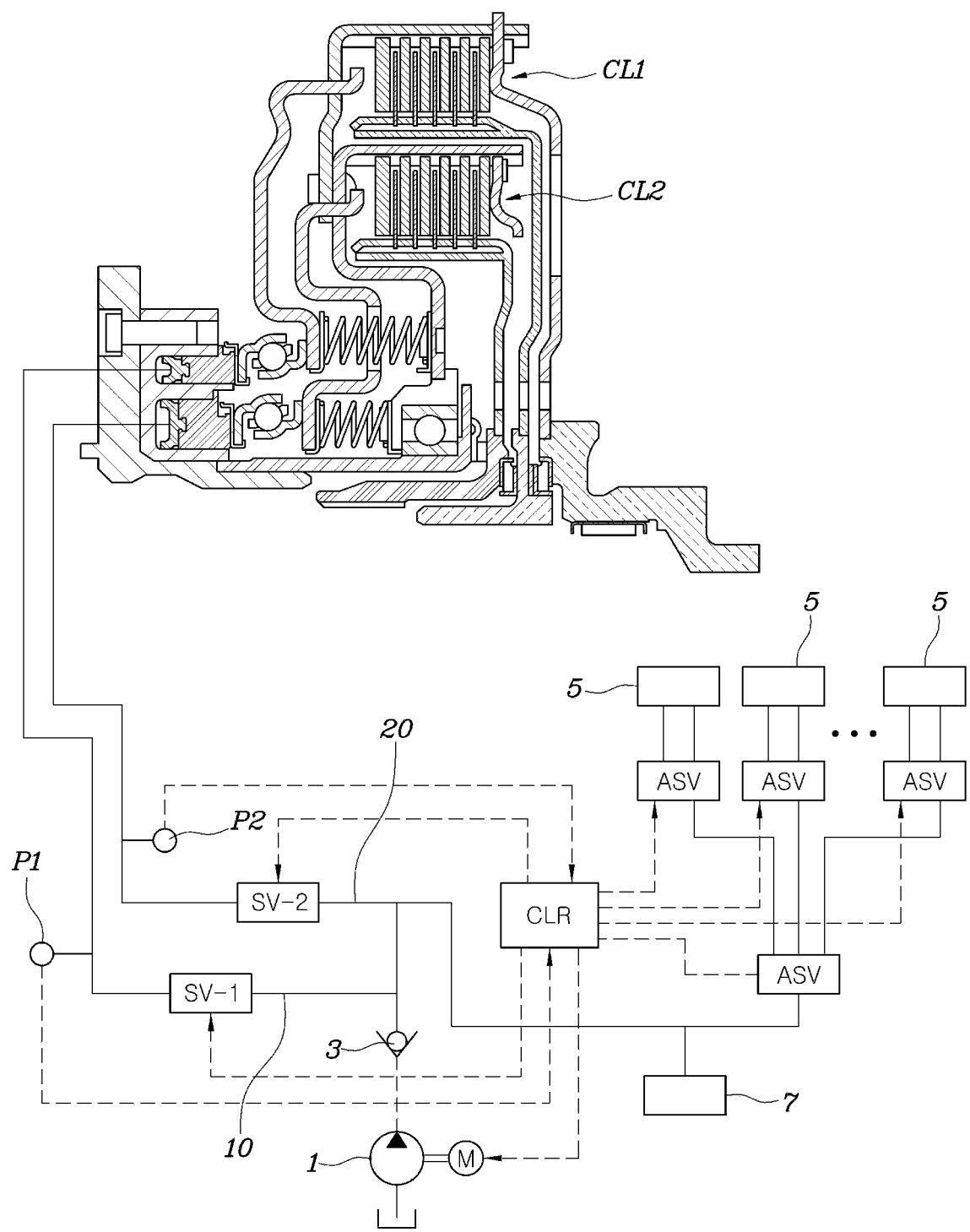
FIG. 1 is a view showing the configuration of a hydraulic pressure supply system for a DCT to which the present invention may be applied.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, an oil pump 1 is an electric oil pump which is driven by a motor M and the motor M is controlled by a controller CLR in accordance with a control method to be described below.

Oil pumped by the oil pump 1 passes through a check valve 3 and is then supplied to two clutches CL1 and CL2 through a first channel 10 and a second channel 20 and forming a DCT through two solenoid valves SV-1 and SV-2. Hydraulic pressure of the oil which is supplied to the two clutches may be measured respectively by hydraulic pressure sensors P1 and P2 that are separately provided.

The two clutches CL1 and CL2 are multi-plate clutches each including several plates and discs, and when pressure which is applied by pistons is increased by provided hydraulic pressure, transfer torque of the two clutches is increased.

For reference, in the two clutches of the DCT, the clutch engaged to transmit power from a power source such as an engine to driving wheels is referred to as a drive side clutch and the clutch which is not in charge of power transmission while the drive side clutch transmits power is referred to as a non-drive side clutch.

There is no specific pressure sensor for measuring the line pressure generated between the check valve 3 and the two solenoid valves SV-1 and SV-2 and the line pressure is provided to be configured to drive several actuators 5 for shifting of the DCT and is maintained at a stable level by an accumulator 7.

The actuators 5 are also controlled by specific solenoid valves that are controlled by the controller CLR and these solenoid valves are indicated by 'ASV' in FIG. 1 to be discriminated from the two solenoid valves SV-1 and SV-2 for controlling the two clutches.

Figure 2:
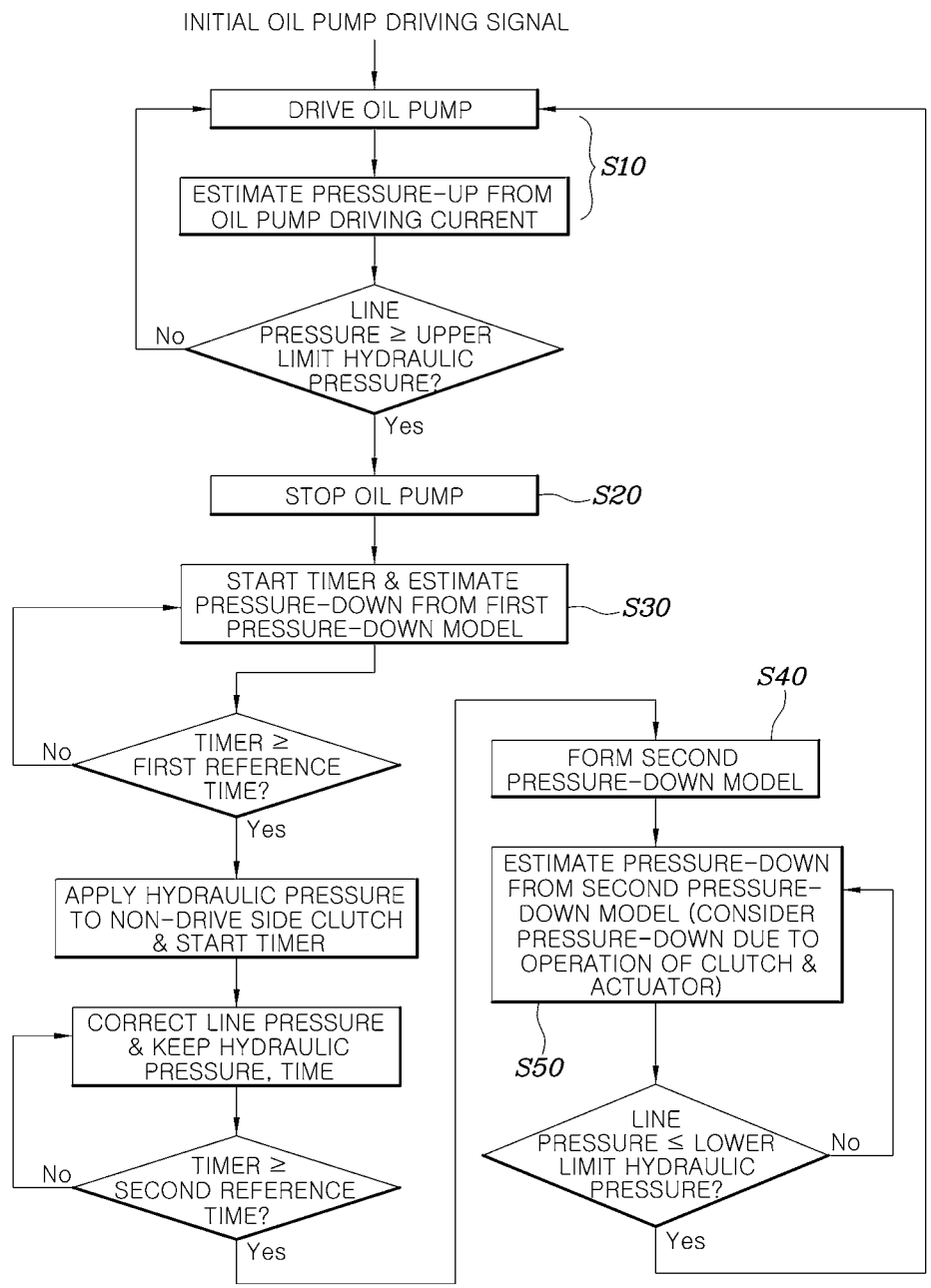
FIG. 2 is a flowchart showing an exemplary embodiment of an oil pump control method for a DCT according to an exemplary embodiment of the present invention.
Figure 3:
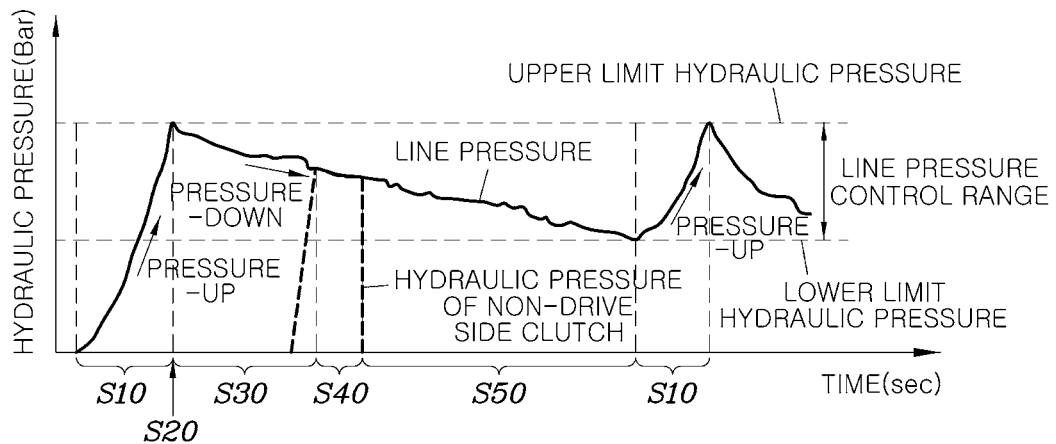
FIG. 3 is a graph showing a change of a line pressure which is controlled in accordance with various aspects of the present invention to time.

Referring to FIG. 2, an exemplary embodiment of an oil pump control method for a DCT of the present invention includes: an pressure-up step in which a controller drives an oil pump and estimates line pressure which is generated by the oil pump, using a pressure-up model formed from a relationship between an oil pump driving current and a hydraulic pressure (S10); a stopping step in which the controller stops the oil pump when the line pressure estimated from the pressure-up model is equal to or higher than a predetermined upper limit hydraulic pressure (S20); a first pressure-down estimation step that estimates a dropping line pressure from a first pressure-down model for a predetermined first reference time after stopping the oil pump on the basis of the line pressure estimated when the oil pump is stopped as an initial value of the first pressure-down model (S30); a model-forming step that forms a second pressure-down model by opening a solenoid valve supplying hydraulic pressure to a non-drive side clutch, correcting the line pressure and measuring hydraulic pressure for a predetermined second reference time using a hydraulic pressure sensor provided to measure hydraulic pressure acting in the non-drive side clutch (S40); and a second pressure-down step in which the controller estimates a line pressure from the second pressure-down model, and returns to the pressure-up step (S10) when the line pressure reaches predetermined lower limit hydraulic pressure or less (S50).

That is, the present invention makes it possible to reduce costs by not requiring a separate pressure sensor that can measure the line pressure, to increase the fuel efficiency and driving range of a vehicle by decreasing power consumption by not always driving the oil pump, and to enable the controller to estimate line pressure through the pressure-up step (S10), the first pressure-down estimation step (S30), and the second pressure-down estimation step (S50) to be configured to appropriately supply hydraulic pressure required by a DCT.

The pressure-up model in the pressure-up step (S10) is configured as a regression model formed on the basis of data of current of a motor driving the oil pump and hydraulic pressure correspondingly generated by the oil pump with the oil pump driven at a constant speed at specific oil temperature.

That is, when oil temperature is constant and the oil pump is driven at a constant speed, the power of the motor driving the oil pump is constant, which follows the following physical law.

$$W(\text{power})=V(\text{voltage})*i(\text{current})=T(\text{torque})*\omega(\text{angular speed})=P(\text{hydraulic pressure})*Q(\text{flow rate})$$

When the angular speed of an oil pump is constant, the flow rate is constant, so the present physical law utilizes the principle that when the voltage of a motor driving an oil pump is constant, pressure is proportioned to the current of the motor driving the oil pump.

Figure 4:
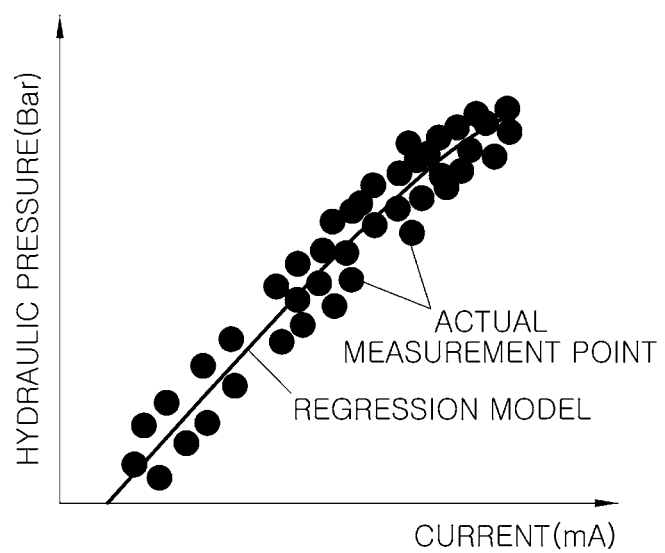
FIG. 4 is a view showing a pressure-up model which is used in a pressure-increasing step of the present invention.

FIG. 4 illustrates, at the upper portion, defining a regression model on the basis of several actual measurement points where discharging hydraulic pressure of an oil pump according to current which is supplied to a motor of the oil pump has been measured.

The regression model, for example, may be defined as $$P(\text{hydraulic pressure}) = a*i^2 + b*i + c$$

where a, b, and c are constants and i is the motor current of the oil pump.

A method of estimating hydraulic pressure in terms of energy by integrating motor current of the oil pump may be used to estimate the hydraulic pressure generated by the oil pump, but the reason of estimating hydraulic pressure using a regression model based on experiments, as described above, is because a hydraulic pressure supply system for a DCT using the hydraulic pressure is not completely hermetically sealed and always has probability of oil leakage.

The upper limit hydraulic pressure in the stopping step and the lower limit hydraulic pressure in the second pressure-down estimation step are respectively an upper limit and a lower limit of pressure suitable for the line pressure and are values determined through designing in accordance with DCTs.

The first pressure-down model is set to consider the largest leakage of line pressure due to a check ball accommodated in a worst state on a valve seat of the check valve disposed to stop oil that flows back to the oil pump when the oil pump is stopped.

That is, a seating behavior of the check ball of the check valve immediately after the oil pump stops operating has the largest influence on a change of the line pressure while the first pressure-down estimation step (S30) using the first pressure-down model to estimate the line pressure is performed. Furthermore, the check ball of the check valve is appropriately accommodated on the valve seat in a normal state immediately when the oil pump is stopped in accordance with intention of design, but if not so, the largest line pressure drop occurs and line pressure over a predetermined level is required to secure stable control of the DCT. Accordingly, the line pressure is estimated under the assumption of the worst situation.

Figure 5:
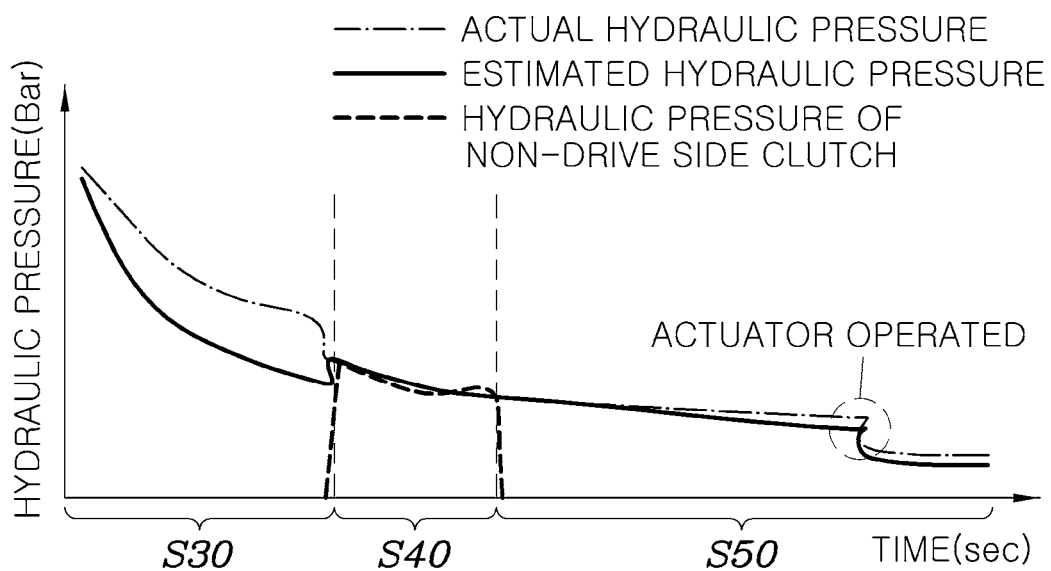
FIG. 5 is a view showing a first pressure-down estimation step, a model-forming step, and a second pressure-down estimation step of the present invention.

For reference, it is shown in FIG. 5 that estimated hydraulic pressure more rapidly drops than actual hydraulic pressure during the first pressure-down estimation step.

Accordingly, it is preferable to set the predetermined first reference time in accordance with the maximum time which is taken until tendency of a change according to time of line pressure is stabilized after the check ball of the check valve disposed to stop oil that flows back to the oil pump is accommodated on the valve seat when the oil pump is stopped. The predetermined first reference time may be set, for example, as 2 seconds through several experiments.

In the model-forming step (S40), the second pressure-down model is formed on the basis of a change in hydraulic pressure measured by the hydraulic pressure sensor in accordance with time for the predetermined second reference time with the solenoid valve maximally open.

That is, pressure is measured by the hydraulic pressure sensor provided to be configured to measure hydraulic pressure acting in the non-drive side clutch with the line pressure made the same as the hydraulic pressure supplied to the non-drive side clutch by maximally opening the solenoid valve provided to supply hydraulic pressure to the non-drive side clutch so that the current line pressure and a change of the line pressure according to time may be accurately measured. Accordingly, the second pressure-down model is formed by the tendency of a change in line pressure according to time measured for the second reference time.

Accordingly, the predetermined second reference time may be determined in design at a level where the tendency of a change in line pressure may be found out by the present method, so it may be set, for example, as 1.5 seconds.

The second pressure-down model, for example, may be formed in a straight or parabolic line in which hydraulic pressure gradually decreases as time passes.

The initial value of the second pressure-down model is hydraulic pressure measured by the hydraulic pressure sensor after line pressure is made the same as the hydraulic pressure acting in the non-drive side clutch by opening the solenoid valve.

The model-forming step (S40) may be performed together with learning touch points of the non-drive side clutch.

That is, in DCT control, it is necessary to repeatedly and continuously learn touch points of a clutch for securing more accurate DCT control performance and methods of learning touch points are usually performed while supplying hydraulic pressure to a non-drive side clutch, so it is preferable to learn touch points of the non-drive side clutch when performing the model-forming step (S40).

In the model-forming step (S40), as hydraulic pressure is supplied to the non-drive side clutch, the line pressure decreases, which may be considered as a loss of energy, but learning of touch points that has to be performed is performed together with the model-forming step (S40), as described above, being able to minimize or prevent unnecessary loss of energy.

The amount of hydraulic pressure drop due to operations of devices that are driven by the line pressure is considered in the second pressure-down estimation step (S50).

The device that are operated by the line pressure are the two clutches or actuators for shifting and the amount of hydraulic pressure drop due to the operations of the devices is obtained from a map formed by measuring a level of line pressure and oil temperature when the devices are operated and line pressure that drops due to the operation of the devices.

That is, line pressure drops when the two clutches or the actuators are operated, which is influenced by the level of line pressure and oil temperature when the devices are operated and the operation time of the devices. Accordingly, a specific map considering the relationships of the factors is configured in advance so that when a clutch or an actuator is operated during the second pressure-down estimation step (50), how much line pressure drops in accordance with the operation time of the clutch or the actuator at the level of corresponding line pressure and oil temperature is obtained from the map and the drop is subtracted from pressure determined by the second pressure-down model, estimating line pressure.

When the controller estimates that the line pressure drops to the lower limit hydraulic pressure or less during the second pressure-down estimation step (S50), the controller drives the oil pump again and performs the pressure-up step (S10).

As described above, according to an exemplary embodiment of the present invention, by repeatedly performing the sequential processes from the pressure-up step (S10) to the second pressure-down step (S50), it is possible to use minimum energy and stably supply hydraulic pressure required by a DCT even without a specific sensor for measuring line pressure.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An oil pump control method for a Dual Clutch Transmission (DCT), the method including:
    driving, by a controller, an oil pump and estimating a first line pressure which is generated by the oil pump, using a pressure-up model formed from a relationship between a driving current of the oil pump and a hydraulic pressure thereof;
    stopping, by the controller, the oil pump when the first line pressure estimated from the pressure-up model is equal to or higher than a predetermined upper limit hydraulic pressure;
    estimating, by the controller, a dropping line pressure from a first pressure-down model for a predetermined first reference time after stopping the oil pump on a basis of the first line pressure estimated when the oil pump is stopped as an initial value for the first pressure-down model;
    forming, by the controller, a second pressure-down model by opening a solenoid valve supplying hydraulic pressure to a non-drive side clutch after the estimating of the dropping line pressure from the first pressure-down model, correcting the first line pressure and measuring hydraulic pressure for a predetermined second reference time using a hydraulic pressure sensor provided to measure hydraulic pressure acting in the non-drive side clutch; and
    estimating, by the controller, a second line pressure from the second pressure-down model, and returning to the driving of the oil pump and the estimating of the first line pressure which is generated by the oil pump, when the estimated second line pressure is equal to or lower than a predetermined lower limit hydraulic pressure.

2. The method of claim 1, wherein an initial value of the second pressure-down model is hydraulic pressure measured by the hydraulic pressure sensor after a line pressure is made a same as hydraulic pressure acting in the non-drive side clutch by opening the solenoid valve.

3. The method of claim 1, wherein an amount of hydraulic pressure drop due to operations of devices that are driven by the first line pressure is considered in the second pressure-down estimation step.

4. The method of claim 3, wherein the amount of hydraulic pressure drop due to the operations of the devices that are driven by the first line pressure is obtained from a map formed by measuring a level of a line pressure and an oil temperature when the devices are operated and a line pressure that drops due to the operation of the devices.

5. The method of claim 4, wherein the devices include clutches having the non-drive side clutch or actuators for shifting of the DCT.

6. The method of claim 1, wherein the pressure-up model is a regression model formed on a basis of data of current of a motor driving the oil pump and hydraulic pressure correspondingly generated by the oil pump with the oil pump driven at a constant speed at predetermined oil temperature.

7. The method of claim 6, wherein the regression model is defined as an equation of $P=a*i^2+b*i+c$,
    wherein P is hydraulic pressure,
    wherein a, b, and c are constants, and
    wherein i is the current of the motor.

8. The method of claim 1, wherein the first pressure-down model is set to consider a largest leakage of the first line pressure due to a check ball accommodated on a valve seat of a check valve mounted to stop oil that flows back to the oil pump when the oil pump is stopped.

9. The method of claim 1, wherein the predetermined first reference time is set in accordance with a maximum time which is taken until tendency of a change according to time of the first line pressure is stabilized after a check ball of a check valve mounted to stop oil that flows back to the oil pump is accommodated on a valve seat when the oil pump is stopped.

10. The method of claim 1, wherein in the forming of the second pressure-down model, the second pressure-down model is formed on a basis of a change in hydraulic pressure determined by the hydraulic pressure sensor in accordance with time for the predetermined second reference time with the solenoid valve maximally open.

11. The method of claim 10, wherein the forming of the second pressure-down model is performed together with learning touch points of the non-drive side clutch.

12. The method of claim 1,
    wherein the hydraulic pressure sensor includes a first hydraulic pressure sensor and a second hydraulic pressure sensor, and
    wherein oil discharged from the oil pump passes through a check valve and is then supplied to two clutches including the non-drive side clutch and forming the DCT through two solenoid valves including the solenoid valve supplying hydraulic pressure to the non-drive side clutch, hydraulic pressure of the oil which is supplied to the two clutches is measured respectively by the first and second hydraulic pressure sensors that are separately provided.

13. The method of claim 1, wherein no pressure sensor for measuring line pressure generated between the check valve and the two solenoid valves is not provided.

14. A hydraulic pressure supply system including:
    a hydraulic circuit configured such that oil discharged from the oil pump passes through a check valve and is then supplied to two clutches including the non-drive side clutch and forming the DCT through two separate solenoid valves including the solenoid valve supplying the hydraulic pressure to the non-drive side clutch, and pressure of the oil supplied to the two clutches is configured to be measured by first and second hydraulic pressure sensors, respectively; and
    a controller configured for controlling the oil pump using the method of claim 1.

15. The hydraulic pressure supply system of claim 14, wherein no pressure sensor for measuring a line pressure generated between the check valve and the two separate solenoid valves is not provided in the hydraulic circuit.

16. A hydraulic pressure supply system comprising:
   a first clutch and a second clutch forming the DCT, wherein at least one of the first clutch and the second clutch is the non-drive side clutch;
   a check valve connected to a first channel connected to the first clutch and a second channel connected to the second clutch;
   a first solenoid valve mounted on the first channel and a second solenoid valve mounted on the second channel, wherein one of the first and second solenoid valves is the solenoid valve supplying the hydraulic pressure to the non-drive side clutch;
   the oil pump fluidically connected to the check valve, wherein oil discharged from the oil pump passes through the check valve and is then supplied to the first and second clutches through the first and second solenoid valves,
   a controller connected to the first solenoid valve, the second solenoid valve and the oil pump and configured for controlling the oil pump using the method of claim 1.

17. The hydraulic pressure supply system of claim 16, wherein no pressure sensor for measuring a line pressure generated between the check valve and the first and second solenoid valves is not provided in the hydraulic pressure supply system.

* * * * *